United States Patent Office 2,731,498
Patented Jan. 17, 1956

2,731,498

BASIC DERIVATIVE OF 4-CYCLOHEXYL-CYCLOHEXANONE AND PROCESS FOR THE MANUFACTURE THEREOF

Max Walter, Basel, Switzerland, assignor to Hoffmann-La Roche Inc., Nutley, N. J., a corporation of New Jersey No Drawing. Application April 28, 1954,
Serial No. 426,309

Claims priority, application Switzerland May 12, 1953

4 Claims. (Cl. 260—563)

The present invention is concerned with novel basic derivatives of 4-cyclohexyl-cyclohexanone, more particularly with 2-dimethylaminomethyl-4-cyclohexyl-cyclohexanone and the acid addition salts thereof, and with a process for the manufacture of the said compounds.

The most preferred salt of 2-dimethylaminomethyl-4-cyclohexyl-cyclohexanone is the hydrochloride which melts at 105°. It is colorless, slightly hygroscopic, dissolves easily in water and in alcohol, the reaction of the solution thus obtained being slightly acid, it has no odor and has a bitter taste. It exhibits a powerful action against fungi and may be used as a therapeutic agent against fungus infections of the body, for example in form of solutions, of ointments or in powder form, the powder being preferably made up of the 2-dimethylaminomethyl-4-cyclohexyl-cyclohexanone-hydrochloride in admixture with other powders, such as talcum or diatomaceous earth.

The process provided by the invention for preparing the above compounds comprises reacting 4-cyclohexyl-cyclohexanone with formaldehyde or a formaldehyde polymerisate, and with dimethylamine or a salt of the latter.

The highest dilutions of 2-dimethylaminomethyl-4-cyclohexyl-cyclohexanone-hydrochloride at which the growth of both cultures of fungi which are pathogenic to the skin is still inhibited are the following:

Trychophyton mentagrophytes _____ 1 : 1,000,000
Achorion Quinckeanum _____ 1 :   100,000
Achorion Schoenleinii _____ 1 :   100,000

In contradistinction thereto, undecylenic acid, which is a well-known preparation for the treatment of dermatomycosis, exerts an action upon strains of tricho-phyton only up to a dilution of 1:1000 (Klinische Wochenschrift 1950, page 429).

When treating guinea-pigs infected with *Trychophyton mentagrophytes* by means of 2.5 per cent ointment of 2-dimethylaminomethyl-4-cyclohexyl-cyclohexanone-hydrochloride, the duration of the fungus infection of the fell is reduced to one-half, whereas by treatment with a 10 per cent undecylenic acid ointment, the infection is of as long a duration as that of a control group of untreated animals.

Example 365 parts by weight of 4-cyclohexyl-cyclohexanone (prepared according to C. H. Shunk & A. L. Wilds, J. Am. Chem. Soc. 71 [1949], page 3946) are dissolved in 1000 parts by volume of absolute alcohol and 82 parts by weight of dimethylamine hydrochloride are added thereto. In the course of 10 hours, 30 parts by weight of paraformaldehyde are added in 10 portions, while refluxing the mixture. The alcohol is then distilled off and the residue is dissolved, while stirring, in 500 parts of water and 500 parts by volume of ether. The clear aqueous layer is made alkaline to phenolphthaleine with ammonia and it is exhaustively extracted with 200 parts by volume each of ether. The united ethereal solutions are dried over sodium sulfate and 2-dimethylaminomethyl-4-cyclohexyl-cyclohexanone hydrochloride is precipitated with alcoholic hydrochloric acid. After having been recrystallized from alcohol/ether, it melts at 105°. The novel compound is slightly hygroscopic and colorless; it is easily soluble in water and fairly soluble in alcohols, the solutions thus obtained being of slightly acid reaction.

I claim:

1. A member of the group consisting of 2-dimethylaminomethyl-4-cyclohexyl-cyclohexanone and acid addition salts thereof.

2. 2-dimethylaminomethyl-4-cyclohexyl-cyclohexanone-hydrochloride.

3. 2-dimethylaminomethyl-4-cyclohexyl-cyclohexanone.

4. A process for the production of a compound selected from the group consisting of 2-dimethylaminomethyl-4-cyclohexy-cyclohexanone and acid addition salts thereof which comprises reacting under reflux conditions 4-cyclohexyl-cyclohexanone with a member of the group consisting of formaldehyde and a formaldehyde polymer as a first reactant, and with a member of the group consisting of dimethylamine and a dimethylamine salt as a second reactant.

No references cited.